(12) United States Patent
York

(10) Patent No.: US 6,888,271 B2
(45) Date of Patent: May 3, 2005

(54) HIGH POWER DENSITY ALTERNATOR BOBBIN

(75) Inventor: Michael T. York, Chelsea, MI (US)

(73) Assignee: Visteon Global Technologies, Inc., Dearborn, MI (US)

(*) Notice: Subject to any disclaimer, the term of this patent is extended or adjusted under 35 U.S.C. 154(b) by 135 days.

(21) Appl. No.: 10/264,778

(22) Filed: Oct. 4, 2002

(65) Prior Publication Data

US 2004/0066108 A1 Apr. 8, 2004

(51) Int. Cl.⁷ ................................................ H02K 37/24
(52) U.S. Cl. ...................... 310/49 A; 310/194; 310/263; 310/261
(58) Field of Search ............................. 310/194, 49 A, 310/263, 261

(56) References Cited

U.S. PATENT DOCUMENTS

| 2,243,318 | A | | 5/1941 | Rawlings |
| 3,483,411 | A | | 12/1969 | Amako et al. |
| 4,117,793 | A | | 10/1978 | Preece et al. |
| 4,307,314 | A | * | 12/1981 | Yamada ........................ 310/263 |
| 4,506,180 | A | * | 3/1985 | Shizuka ........................ 310/91 |
| 5,900,688 | A | | 5/1999 | Kreuzer et al. |
| 5,969,459 | A | | 10/1999 | Taniguchi et al. |
| 5,973,423 | A | | 10/1999 | Hazelton et al. |
| 6,107,719 | A | | 8/2000 | Asao |
| 6,252,330 | B1 | | 6/2001 | Asao et al. |
| 6,333,582 | B1 | | 12/2001 | Asao et al. |
| 6,369,486 | B1 | | 4/2002 | Armiroli et al. |

FOREIGN PATENT DOCUMENTS

| FR | 2616280 | 9/1988 |
| FR | 2786626 | 2/2000 |
| GB | 2152765 A | 8/1985 |
| GB | 2390752 A | 1/2004 |

* cited by examiner

Primary Examiner—Dang Le
Assistant Examiner—Iraj A. Mohandesi
(74) Attorney, Agent, or Firm—Brinks Hofer Gilson & Lione

(57) ABSTRACT

A bobbin for a rotor is of a three-piece construction which allows for greater heat transfer, increased percentage fill, and hence increased power density of the alternator. Preferably, the three-piece assembly includes an injection molded plastic core, and opposing end caps constructed of a laminate material having good tear resistance.

19 Claims, 4 Drawing Sheets

HIGH POWER DENSITY ALTERNATOR BOBBIN

FIELD OF THE INVENTION

The present invention relates generally to rotors for alternators, and more particularly relates to bobbins used in such rotors.

BACKGROUND OF THE INVENTION

Currently, the majority of all vehicles driven today use front-end accessory drive alternators that contain Lundell style rotors, also known as "claw pole" rotors. The rotor provides the alternator's magnetic field and rotates within the machine. The rotor includes a field coil made up of a number of insulated copper wires wrapped around an electrically insulated bobbin. The bobbin surrounds a steel hub, and also insulates the field coil from the steel pole pieces which sandwich the field coil to form north and south poles. The magnetic field is generated when the field coil is energized and a current flows through the wires.

It is well known that the magnetic field strength that the rotor provides is proportional to the amount of power the alternator can provide to the vehicle system. The field strength is increased by increasing the size of the coil, or by applying more field current flowing through the windings. However, as the current increases in the field coil, the power dissipation in the form of heat goes up at a rate that is squared due to the governing equation $P=I^2R$, where P equals the power dissipation due to heat, I equals current, and R equals resistance of the coil.

Accordingly, is it important to dissipate as much heat from the hot copper field windings as possible. Preferably, heat is dissipated to the relatively cool steel pole pieces. Furthermore, maximizing the amount of field coil space allows the number of wires wraps (turns) to be increased, providing more magnetic field and hence greater output power.

One type of rotor incorporates the steel core into the pole pieces. Thus, each pole piece includes one half of the steel center hub, and a single face-to-face contact region. Additionally, the bobbin may be injection molded out of a plastic material such as nylon 6—6. The nylon offers flexibility to allow the end cap flaps to be bent over when the poles are assembled onto the bobbin. Unfortunately, this design has its drawbacks. More specifically, the flexibility of the bobbin end caps is due to the material being a generally soft polymer that cannot withstand a lot of contact force created when the bobbin is fit between the pole pieces. Furthermore, injection molding of the bobbin requires a rather large material thickness of the bobbin. The thick material inhibits dissipation of heat, and decreases the space available for the field coil. Thin bobbins cannot be formed because the bobbin mold must fill with molten plastic within a reasonable cycle time.

Accordingly, there exists a need to provide an alternator rotor and bobbin that maximizes the available space for the field coil, increases the dissipation of heat to increase the power density of the alternator, and improves the amount of contact force that can be applied between the field coil and the pole pieces.

BRIEF SUMMARY OF THE INVENTION

The present invention provides a bobbin that can be made very thin, and the end caps can be made of a very durable material. Since the bobbin is decreased in size, there is more space for the field coil and hence more field strength. Further, the heat transfer from the hot copper wires to the cool steel core is increased. Additionally, the strong end caps allow an increased contact force to be applied between the field coil and the pole pieces, increasing the percentage fill of the field coil and increasing the heat transfer between the wires and the pole pieces.

BRIEF DESCRIPTION OF THE DRAWINGS

The accompanying drawings incorporated in and forming a part of the specification illustrate several aspects of the present invention, and together with the description serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
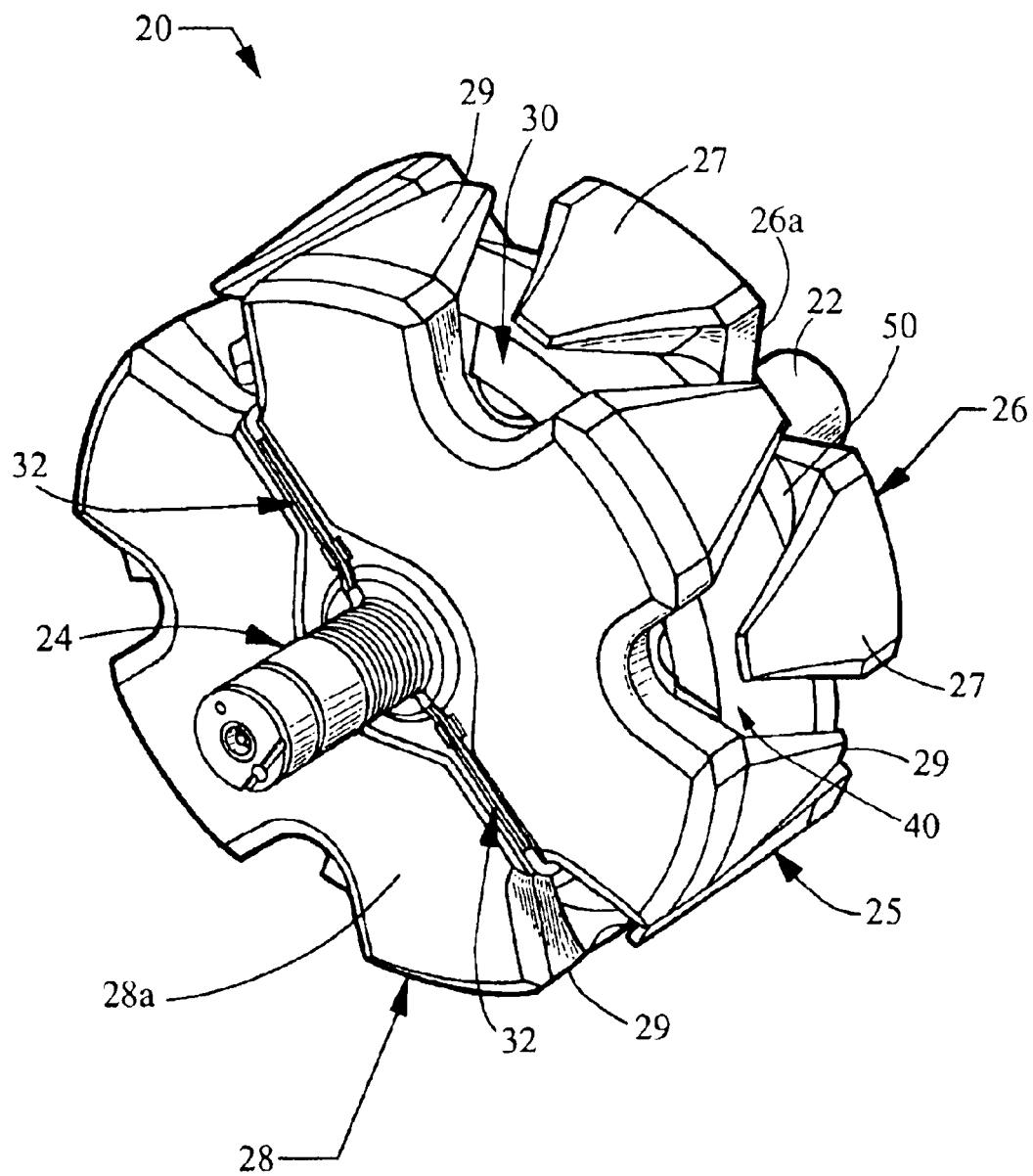
FIG. 1 is a perspective view of an embodiment of a rotor having a bobbin constructed in accordance with the teachings of the present invention.

Turning now to the figures, FIG. 1 shows an assembled rotor 20 having a bobbin 50 constructed according to the invention. Generally, the rotor includes a shaft 22 defining a central axis passing through the center of the rotor and including a slip ring assembly 24 for providing power to the rotor 20. The rotor further includes a first or front pole 26 and a second or rear pole 28. These opposing poles 26, 28 each include a plurality of fingers 27, 29, respectively, which are equidistantly spaced about the periphery of the poles 26, 28. The fingers 27, 29 depend transversely from the main bodies 26a, 28a of the poles 26, 28, and accordingly extend in an axial direction. The fingers 27, 29 thus face each other when the rotor 20 is assembled. Accordingly, the peripheral side surface 25 of the rotor 20 generally alternates between the fingers 27 and fingers 29 of the front pole 26 and the rear pole 28, respectively.

The poles 26, 28 are used to encase a coil assembly 30 therebetween. The coil assembly includes two leads 32 which extend in a slot along the outer surface of the rear pole main body 28a for internal connection to the slip ring assembly 24. The leads 32 include a wire 31 which is covered with insulation 33. When the coil 30 is powered via the slip ring assembly 24 and leads 32, a magnetic field is generated which flows through the pole pieces 26, 28, while the entire rotor assembly 20 is rotated via shaft 22 within the alternator.

Figure 2:
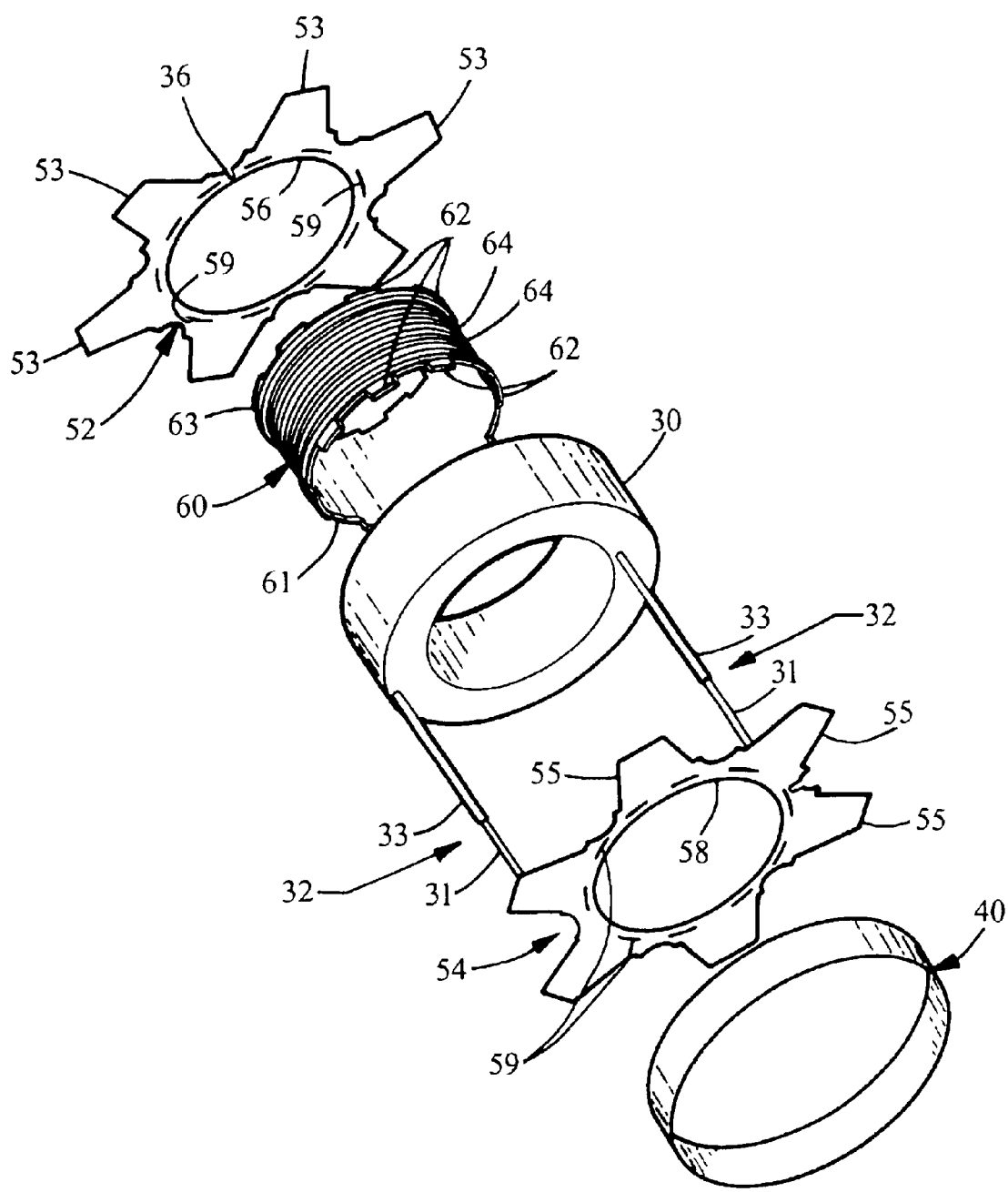
FIG. 2 is an exploded view showing the construction of the bobbin assembly and the field coil.

Turning now to further details of the construction of the rotor assembly 20, an exploded view of a portion of the rotor 20 is presented in FIG. 2. The field coil 30 (illustrated in a solid form, but understood to be a wound coil) is wound about a bobbin 50 (FIG. 3) which has a novel construction. More specifically, the bobbin 50 is of a three-piece construction which allows for a structure that enhances heat dissipation and increases power density of the rotor 20. Briefly, the bobbin 50 can be made very thin, and its end caps can be made of a very durable material. Since the bobbin is decreased in size, there is more space for the field coil and hence more field strength. Further, the heat transfer from the hot copper wires to the cool steel core is increased. Additionally, the strong end caps allow an increased contact force to be applied between the field coil and the pole pieces, increasing the percentage fill of the field coil and increasing the heat transfer between the wires and the pole pieces.

The bobbin 50 includes a first end cap 52 and a second end cap 54. The end caps 52, 54 are attached to opposing ends of a cylindrical core or cylinder 60, as will be described in more detail herein. The cylinder 60 is of a hollow shape, and is constructed of a plastic, preferably an engineered plastic such as nylon 6—6. Other polymers could be substituted and will work equally well. The cylinder 60 defines opposing end edges 61, 63 each having a plurality of protrusions 62 projecting therefrom.

Since the end caps 52, 54 are separately formed, the cylinder 60 can be molded very thin since the molten plastic does not have to flow far into the mold. Preferably, the core is molded to a wall thickness less than 0.5 mm thick. However, it will be recognized by those skilled in the art that thicker parts would also work. Nonetheless, it is desirable to make the cylindrical core 60 as thin as possible in order to increase the amount of space for the field coil 30, as well as to improve the heat transfer from the hot field coil wires 30 to the center steel hub (one of which can be seen in FIG. 6 and designated at 46) of each pole piece 26, 28.

Additionally, injection molding the cylinder 60 allows the formation of a plurality of grooves 64 on the outside surface of the cylinder core 60. These grooves 64 help guide the first layer of wires during the winding process of the field coil 30. This improves the quality of the winding by helping the first layer to be properly spaced, enabling the next layer to also be properly spaced. In this way, the winding density of the coil in the limited space is maximized, while air gaps are minimized. The cylinder core 60 could also be made from a molded flat sheet of plastic that is rolled up and seam molded together. Similarly, all other types of plastic welding can also be applied.

The end caps 52, 54 are preferably made from a laminate sheet structure consisting of a combination of polyester and Nomex® material. However, a number of other laminates would also work, for example, paper laminates. In addition, stamped or modeled polymer end caps may also be used. Nonetheless, the laminate structure is preferred because of its ability to resist tearing and puncture. That is, laminates typically exhibit higher tear strength than its plastic polymer counterparts. This allows the field coil 30 to be "crushed" between the pole pieces 26, 28 with greater force, increasing the heat transfer by virtue of increased contact area and contact force. Additionally, more wire can be wound into the field coil 30, since the coil 30 decreases in size when it is sandwiched or crushed between the pole pieces 26, 28.

Each end cap 52, 54 includes a plurality of flaps 53, 55 which project radially outwardly and are equidistantly spaced about the end caps 52, 54. The flaps 53, 55 are numbered, sized, and structured to correspond with the fingers 27, 29 of the pole pieces 26, 28. It will be recognized that the flaps 53, 55 on the outer circumference of the end caps 52, 54 could be eliminated or modified in shape and size. Each of the end caps 52, 54 also include a plurality of apertures 59 circumferentially spaced about the inner periphery of a central opening 56, 58 formed in each end cap 52, 54 (FIG. 2). The central openings 56, 58 are sized to correspond to the hollow cylinder 60. At least one of the end caps 52, 54 includes a small slot 36 for guiding the start lead 32 (FIG. 3) as previously discussed.

Figure 4:
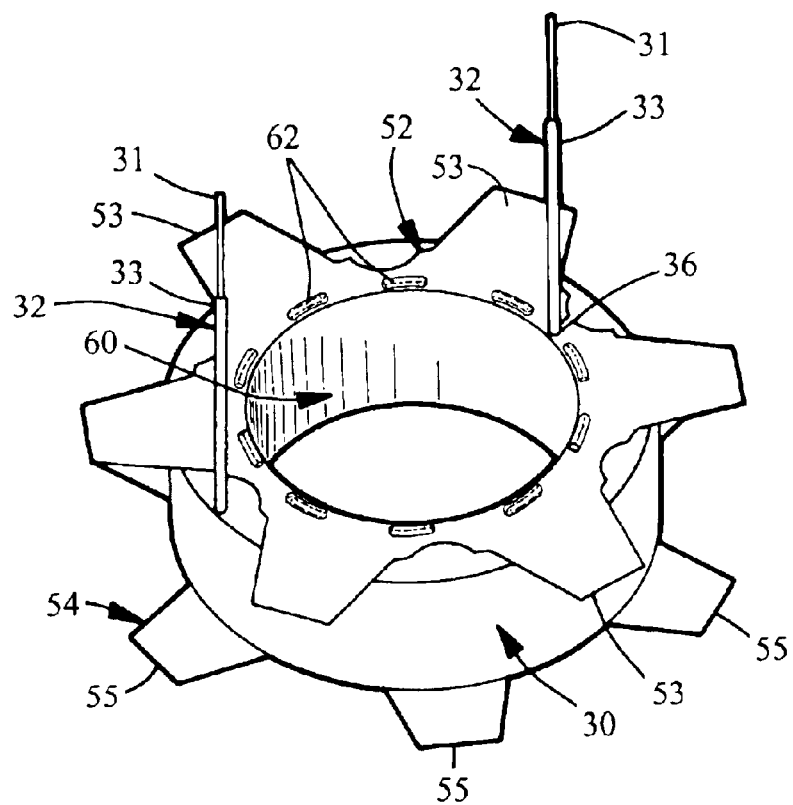
FIG. 4 is a perspective view of the bobbin assembly having the field coil attached thereto.

To assemble the bobbin 50, the end caps 52, 54 are attached to the opposing annular edges 61, 63 (FIG. 2) of the cylindrical core 60. The protrusions 62 extend axially from the edges 61, 63, and are placed through the apertures 59 formed in the end caps 52, 54. Next, the protrusions 62 are ultrasonically staked down, heat staked down or otherwise deformed to form a mushroom-shaped dome over the end caps 52, 54 as shown in FIG. 4. Alternate connection means may also be used instead of staking the protrusions 62 of the plastic core 60 over the end caps 52, 54. For example, the end caps 52, 54 could be attached with an adhesive onto the edges 61, 63 of the cylinder 60. Further, the end caps 52, 54 may be made out of a polymer, and could be ultrasonically welded or friction (spin) welded onto the cylinder 60. It will be recognized that numerous staking, welding, bending, or adhesive techniques may be employed, depending on the material of the cylindrical core 60 and the end caps 52, 54. Finally, many different fasteners could also be employed to connect the endcaps 52, 54 to the cylinder 60, such as snaps, pins, male and female connectors, and the like.

Figure 3:
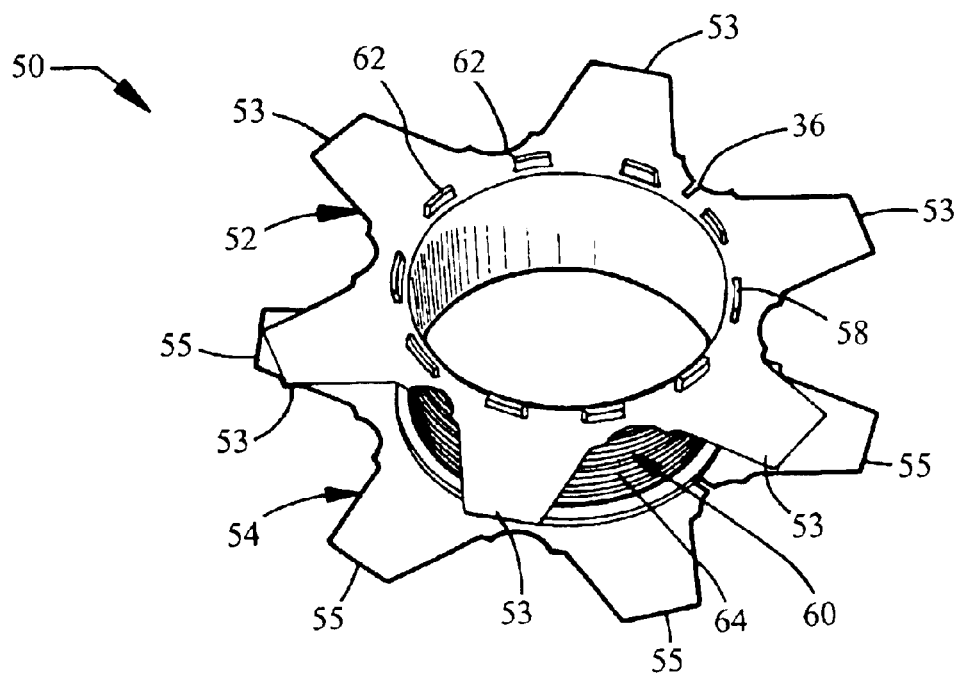
FIG. 3 is a perspective view of the bobbin assembly.
Figure 5:
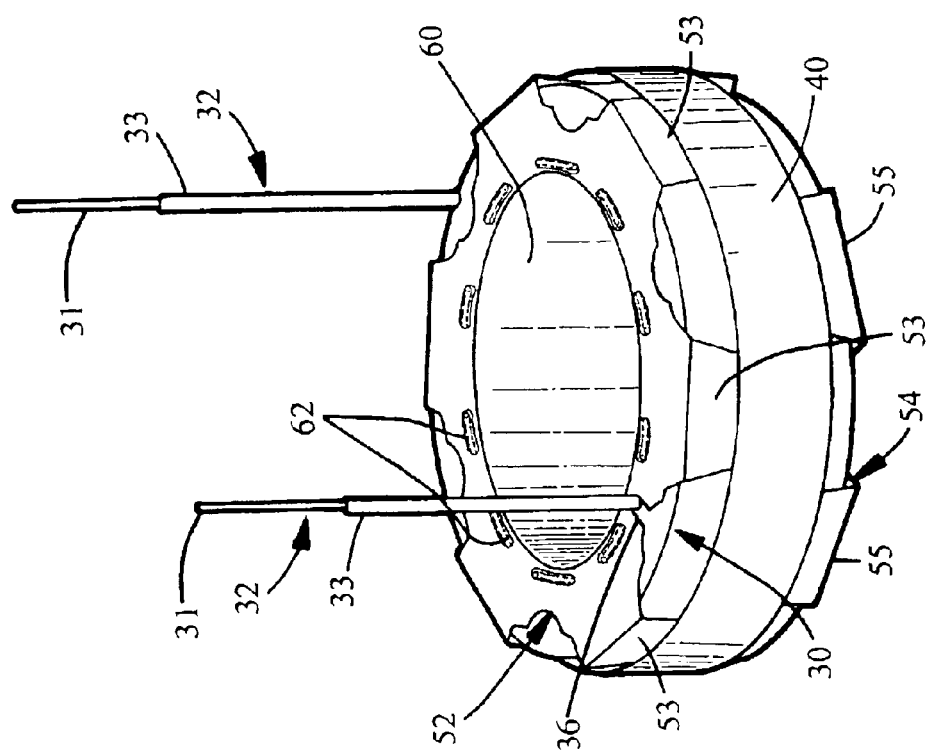
FIG. 5 is a perspective view of the assembled bobbin assembly and field coil.

After locating the start lead 32 in one of the slots 36, the assembled bobbin 50, as shown in FIG. 3, is wound with insulated copper wire to make up the field 30 as shown in FIG. 4. The end lead 32 of the coil 30 exits opposite the other lead 32 cut into the end cap 52 as shown in FIGS. 3 and 4. When all of the coil has been wound completely onto the bobbin 50, the end caps 52, 54 are bent over the outside diameter of the field coil 30. More specifically, each of the plurality of flaps 53, 55 are folded over the outer surface of the field coil 30, and a layer of tape 40 is applied, as shown in FIG. 5. The tape 40 connects the flaps 53 of the first end cap 52 to the flaps 55 of the second end cap 54. The flaps 53, 55 and the tape 40 prevent the field coil 30 from unwinding. Additionally, by connecting the end caps 52, 54 together via the flaps 53, 55 and tape 40, the field coil 30 is prevented from overcoming the thin end cap side walls causing bulging or sagging of the coil 30. It is desirable to keep the field coil wire layers wound to improve the ability to sandwich the coil between the poles 26, 28 during assembly. It will be recognized by those skilled in the art that the step of taping the end cap flaps 53, 55 may be eliminated.

Figure 6:
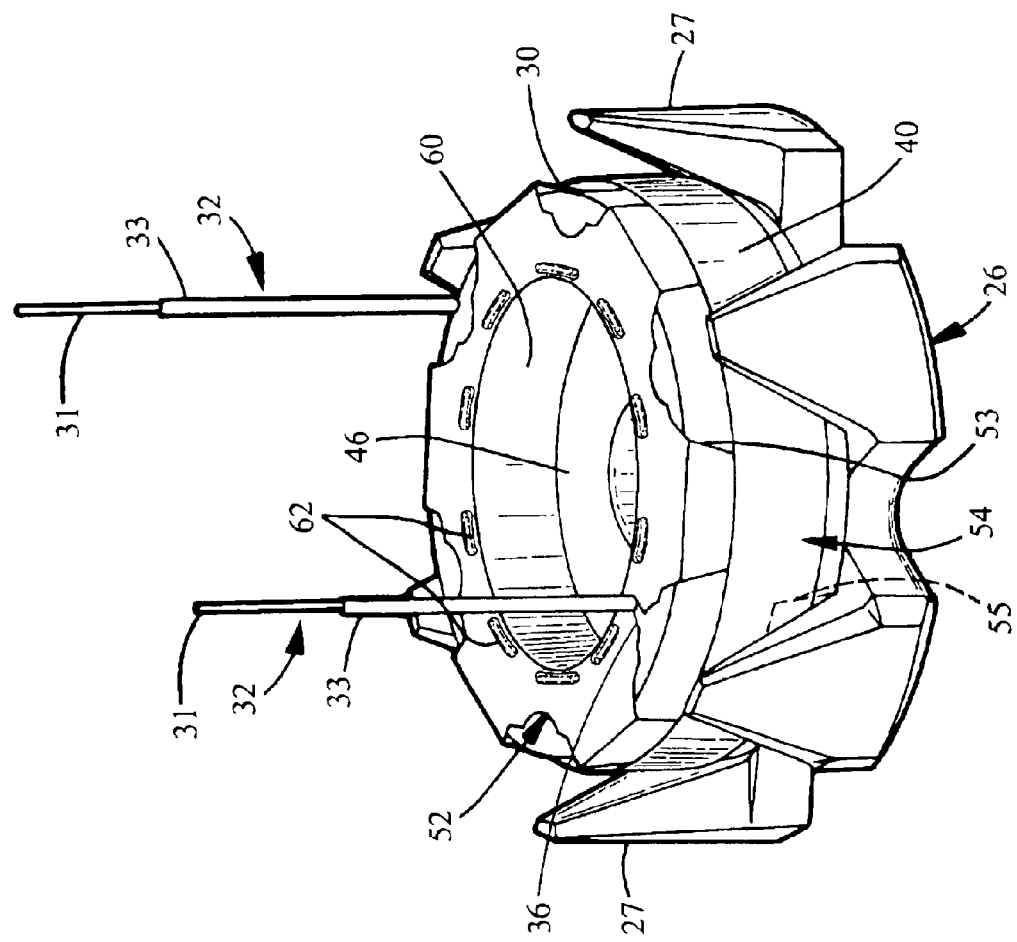
FIG. 6 is a perspective view of the bobbin assembly and coil fitted on a pole piece.

The start and end leads 32 of the coil 30 are sleeved with an insulating layer 33 around the wire 31 to prevent electrical shorts from the leads 32 to the steel pole pieces 26, 28. The assembly of the bobbin 50 and the coil 30 are then pressed onto the center hub 46 of one pole, such as pole 26 as shown in FIG. 6. The opposing pole 28 and its hub (not shown) is then pressed onto the assembly shown in FIG. 6, with the faces of each pole hub 46 coming in contact with each other. The shaft 22 is next press-fit through bores defined in the poles 26, 28, keeping them in contact with each other, as shown in FIG. 1.

Accordingly, the three-piece construction of the bobbin 50 of the present invention allows the cylindrical core to be made very thin, and also allows the bobbin end caps to be made from a very thin durable material. Since the bobbin is decreased in size, there is more space for the field coil 30, and hence more field strength. Further, by molding the cylinder 60, the wire guide grooves on the outside diameter of the core can be formed which further increases the percentage fill of field coil by facilitating layered winds. Additionally, since the strong laminate end caps resist tearing during assembly, an increase in the contact force applied on the bobbin 50 in the field coil 30 by the opposing poles 26, 28 provides for an increase in the percentage fill of field coil in the poles, since the copper wires can be crushed together during the assembly process. Still further, there is an increase in the heat transfer between the coil wires and the steel pole pieces by virtue of the increased contact area and contact force. Accordingly, the magnetic field and hence the power density of the alternator is also increased by virtue of these features. As the cylinder is very thin (typically around 0.2 to 0.3 mm), the heat transfer from the hot copper wires to the cool steel core and poles is greatly increased. Also, the time for manufacture of the bobbin is reduced as the molten plastic does not have to flow as far and solidifies quickly. Finally, the ability to utilize pole pieces having an inner steel core integrally formed in each of the pole pieces also adds to an increased magnetic field and power density of the alternator.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A three piece bobbin for a rotor that includes a field coil for generating a magnetic flux and a pair of opposing pole pieces sandwiching the field coil for guiding the magnetic flux, the bobbin being interposed between the field coil and each of the pole pieces to electrically insulate the field coil, the bobbin comprising:

a hollow cylinder constructed of plastic and having a first end and a second end, the cylinder having a thickness in the range of 0.1 mm to 0.5 mm;

a separately formed first end cap constructed of laminate and attached to the first end of the cylinder; and a separately formed second end cap constructed of laminate and attached to the second end of the cylinder.

2. The bobbin of claim 1, wherein the cylinder is injection molded.

3. The bobbin of claim 1, wherein the cylinder includes a plurality of grooves formed on an outer surface of the cylinder for winding the field coil.

4. The bobbin of claim 1, wherein the end caps are constructed of a first material and the cylinder is constructed of a second material, the first material having a greater tear resistance than the second material.

5. A three-piece bobbin for a rotor that includes a field coil for generating a magnetic flux and a pair of opposing pole pieces sandwiching the field coil for guiding the magnetic flux, the bobbin being interposed between the field coil and each of the pole pieces to electrically insulate the field coil, the bobbin comprising:

a pair of end caps constructed from a first material, the pair of end caps including a first end cap and a second end cap;

a cylindrical core constructed of a second material, the cylindrical core having opposing first and second ends, the first end cap extending from the first end and the second end cap extending from the second end; and the first material having a greater tear resistance than the second material.

6. The bobbin of claim 5, wherein the first material has a greater strength than the second material.

7. The bobbin of claim 5, wherein the first material is a fiber composite.

8. The bobbin of claim 5, wherein the first material is a laminate.

9. The bobbin of claim 8, wherein the laminate is a paper laminate.

10. The bobbin of claim 8, wherein the laminate has a sheet structure consisting of a combination of polyester and Nomex® material.

11. The bobbin of claim 5, wherein the cylinder is constructed of injection molded plastic.

12. The bobbin of claim 11, wherein the cylinder has a thickness less than 0.5 mm.

13. The bobbin of claim 5, wherein the end caps are stamp formed.

14. A three-piece bobbin for a rotor that includes a field coil for generating a magnetic flux and a pair of opposing pole pieces sandwiching the field coil for guiding the magnetic flux, the bobbin comprising:

a hollow cylinder having a first end and a second end;

a first end cap connected to the first end of the cylinder;

a second end cap connected to the second end of the cylinder; and means for connecting the first end cap and the second end cap to the cylinder, the connecting means including a plurality of protrusions at the opposing ends of the cylinder, and a plurality of apertures formed in the first and second end caps, the plurality of apertures positioned to correspond with the plurality of protrusions.

15. The bobbin of claim 14, wherein each of the protrusions are passed through corresponding apertures and deformed.

16. The bobbin of claim 15, wherein the protrusions are staked.

17. The bobbin of claim 14, wherein the means for connecting includes bonding the first and second end caps to the first and second ends of the cylinder.

18. The bobbin of claim 17, wherein the first and second end caps are adhesively bonded to the first and second ends of the cylinder.

19. The bobbin of claim 17, wherein the first and second end caps are ultrasonically welded to the first and second ends of the cylinder.

* * * * *